June 23, 1959 C. C. WALLIN 2,892,001
PURIFICATION OF AROMATIC HYDROCARBONS USING
A TWO STAGE SOLID ADSORPTION PROCESS
Filed Jan. 22, 1957
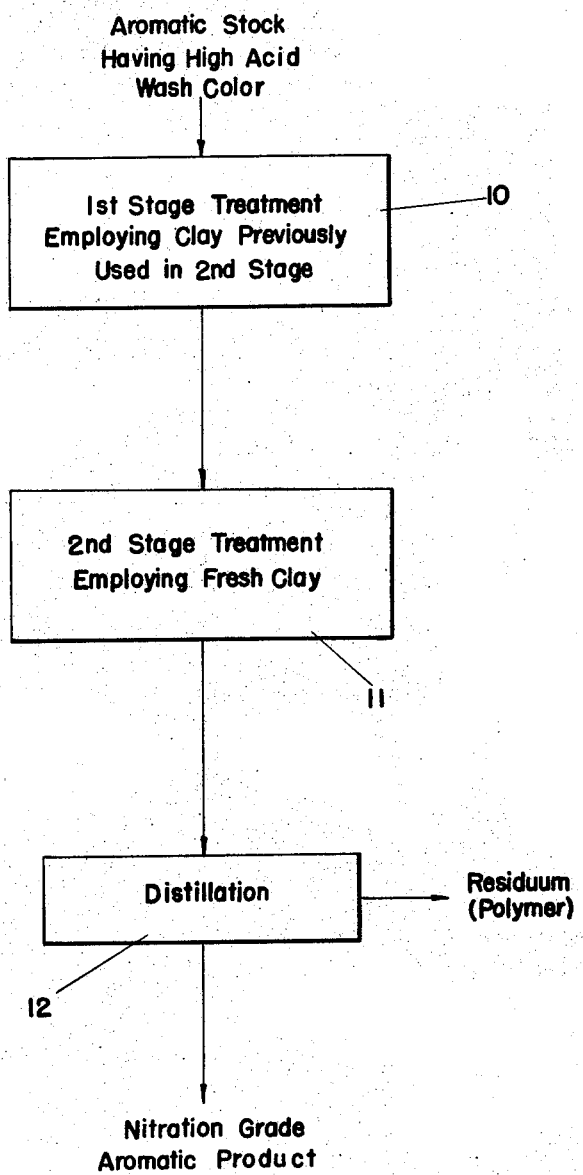
INVENTOR.
CURTISS C. WALLIN
ATTORNEY

United States Patent Office 2,892,001
Patented June 23, 1959

2,892,001

PURIFICATION OF AROMATIC HYDROCARBONS USING A TWO STAGE SOLID ADSORPTION PROCESS

Curtiss C. Wallin, Springfield, Pa., assignor to Sun Oil Company, Philadelphia, Pa., a corporation of New Jersey Application January 22, 1957, Serial No. 635,420

3 Claims. (Cl. 260—674)

This invention relates to the purification of aromatic hydrocarbons and more particularly to the preparation of nitration grade aromatic products. The invention is especially concerned with the manufacture of products of nitration grade from aromatic stocks derived from petroleum and which fail to conform to nitration grade specifications due to poor acid wash color.

Aromatics such as benzene, toluene, xylenes, etc., have been produced from petroleum by various procedures including thermal and catalytic reaction steps in combination with suitable procedures for separating and concentrating the aromatic from non-aromatic products. A procedure now used extensively comprises reforming of petroleum naphthas to convert non-aromatic to aromatic hydrocarbons, followed by selective extraction of the aromatics by means of a suitable solvent such as diethylene glycol.

Aromatics produced from petroleum by procedures involving a thermal or catalytic reaction generally fail to meet nitration grade specifications even though the aromatics have been concentrated to a high stage of purity such as 98% or better. Such products usually fail to meet these specifications due to poor acid wash color, which can be attributed to the presence of small amounts of olefinic constituents that react with and darken the acid employed in the standard acid wash color test (A.S.T.M. method D 848-47).

In order to improve the acid wash color of aromatic hydrocarbons, treatment at elevated temperature with ordinary adsorptive clay, such as is available commercially under such trade names as Attapulgus clay, Floridin, Milwhite and Filtrol, has been employed. Contact of the hot aromatic stock with clay causes the olefinic constituents to polymerize, and the polymers can then be separated from the treated aromatic by distillation. In conducting the clay treatment, the procedure generally used heretofore has been to pass the hot aromatic hydrocarbon stock in liquid phase through a bed of the clay until its activity has decreased to the extent that nitration grade product can no longer be obtained. The used clay then is replaced by fresh clay so that the treating operation can be continued. For example, one batch of clay may be used until the acid wash color of the aromatic effluent exceeds 2, after which it is replaced by a fresh batch.

It has now been found that a more effective use of the clay can be secured by treating the aromatic hydrocarbon stock in two successive stages while employing the clay in the two stages in a particular manner as hereinafter fully described. The two-stage treating operation results in a considerably higher over-all yield of nitration grade aromatic product per ton of clay than can be obtained by operating in the manner conventionally employed heretofore.

In accordance with the invention an aromatic hydrocarbon stock of high aromatic content suitable for making nitration grade product, but which fails to meet acid wash color specifications is treated in a first stage with clay which has previously been used in the second stage of the process. This clay has been previously employed in the second stage until its active capacity for reducing acid wash color has been partially spent but it is still capable of lowering the acid wash color of the aromatic charge to an intermediate level. The hydrocarbon effluent from the first stage is then treated in the second stage with clay which is fresher at least to the extent that it is capable of reducing the acid wash color of the material treated in the second stage to nitration grade level. When the clay in the first stage has become essentially spent, clay from the second stage is then used for the first stage treatment and it is replaced in the second stage treatment by fresh or regenerated clay.

The improvement in over-all yield of nitration grade product per ton of clay used, that is secured by practicing the invention, results from the fact that clay can lose its capacity for reducing acid wash color of an aromatic stock to nitration grade level and yet, as I have now found, it still will have considerable residual capacity for lowering the acid wash color of the stock to an intermediate level. For example, in treating a stock having an acid wash color of 14, clay which has been previously used and no longer is capable of reducing the color to nitration grade level (i.e. below 2) still will have a large capacity for reducing the color, for example, to about 7. Accordingly, by utilizing this residual capacity of the used clay, considerably more product of the desired quality can be made per ton of clay employed than otherwise could be obtained. The economies effected by practicing the invention increase as the acid wash color of the charge stock increases and the advantages become particularly worthwhile in the treatment of aromatic stocks initially having acid wash colors in excess of 10.

The accompanying drawing schematically illustrates the steps involved in the present process. An aromatic hydrocarbon stock, such as benzene, toluene, xylene, etc., which meets nitration grade specifications except for high acid wash color is, as illustrated by numeral 10 in the drawing, brought into contact in liquid phase at elevated temperature with clay which has previously been used in the second stage treatment illustrated by numeral 11. The clay in the first treating step is incapable of reducing the acid wash color of the stock to nitration grade level but it has sufficient residual active capacity to lower the color to an intermediate level. For example, the charge stock may initially have an acid wash color in the range of 10-14 and the effluent from the first treating step may have a color in the range of 4-9. This effluent is then brought into contact in step 11 with fresh or regenerated clay which is capable of reducing the acid wash color to the desired level. Each of the treating steps should be conducted at a temperature above 275° F. but below the critical temperature of the hydrocarbon stock being treated, and preferably sufficient pressure is maintained in the treating zones to keep the hydrocarbon in liquid form. Preferred treating temperatures for each of the stages lie in the range of 300-375° F. It is also preferred that the fresh clay initially used in the second stage treatment have a combined water content in the range of 4.5-7.5%, more preferably 5.8-6.5%, since this improves the capacity of the clay for effecting the desired color reduction as disclosed in Honeycutt et al., United States Patent No. 2,775,632. Also, the water content of the aromatic charge stock fed to the process preferably should be relatively low, since a high water content of the stock will adversely affect the active capacity of the clay as also disclosed in the aforesaid patent.

The process illustrated in the accompanying drawing may be modified if desired by including a distillation step between the first and second clay treating steps for the purpose of removing polymer from the effluent from the first step before it is charged to the second stage treatment. This results in a higher residual activity of the clay from the second stage treatment at the time when it is subsequently used in the first stage treatment and increases the over-all life of the clay.

The effluent from the second treating step 11 has a relatively low acid wash color but it contains some polymeric materials which cause the Saybolt color to be lower than is permissible for nitration grade product. These polymers should be removed in order to obtain product of the desired quality. This may be done by means of distillation step 12, wherein the treated aromatic hydrocarbon is distilled overhead leaving the undesirable polymeric material as residuum. Distillation in this manner not only yields product having the desired Saybolt color but it also further improves the acid wash color.

The process as described above is conducted until the clay used in step 10 has become essentially spent. The clay from the second stage treatment is then employed in the first stage and a new batch of fresh or regenerated clay is used in the second stage. This procedure is repeated whenever the clay in the first stage becomes too inactive to effect substantial reduction in the acid wash color of the charge stock.

The following data illustrate the advantages of the invention. A mixture of benzene and toluene obtained from reforming of naphtha followed by extraction of the reformate with diethylene glycol and having an aromatic content of 99+% and an acid wash color of 14 was subjected to a conventional single stage clay treatment. This was done by percolating the aromatic stock under pressure and at about 300° F. through a bed of Attapulgus clay. The initial acid wash color of the undistilled effluent was 0 to 1; but after 500–600 bbls. of effluent per ton of clay had been obtained, the color rose sharply to about 7 and the clay was no longer capable of yielding nitration quality product. A two-stage treatment was then conducted by continuing the aforesaid treating step and treating the effluent from it in a second step with fresh clay under similar operating conditions. It was found that the clay in the first stage had sufficient residual activity to be capable of yielding additional effluent, having an acid wash color of about 7, in amount in excess of 600 bbls./ton of the clay. Treatment of this amount of effluent by the fresh clay in the second stage made all of it, after removal of polymer by distillation, nitration quality material with an acid wash color less than 1. The clay from the second stage then was capable of being used in the first stage for treating in excess of 1200 bbls./ton of the charge to produce an equivalent amount of effluent suitable for treatment in the second stage with a new batch of fresh clay. Thus, the clay in each stage as herein described had capacity for treating in excess of 1200 bbls. of aromatic hydrocarbon per ton of clay. Operation with two stages in accordance with the invention raised the over-all yield of product of nitration quality from about 500–600 bbls./ton to more than 1200 bbls./ton.

I claim:

1. Method of making nitration grade aromatic hydrocarbon from an aromatic hydrocarbon stock possessing unsatisfactory acid wash color which comprises treating said stock in a first stage with adsorptive clay which has previously been used for treating similar stock until its capacity for reducing acid wash color has been partially spent, then treating the thus treated stock in a second stage with clay having higher activity effective to reduced acid wash color to nitration grade specifications, each of said treatments being conducted at a temperature between 275° F. and the critical temperature of the stock, and distilling the effluent from the second stage treatment to separate polymeric materials and to yield aromatic hydrocarbon product having nitration grade quality, whereby the over-all yield of nitration grade product per ton of clay is higher than would be obtained by treating the stock with clay in a single stage.

2. Method according to claim 1 further including utilizing in the first stage treatment clay from the second stage treatment after its activity has become partially spent and utilizing fresh clay in the second stage.

3. Method of making nitration grade aromatic hydrocarbon from an aromatic hydrocarbon stock possessing unsatisfactory acid wash color which comprises treating said stock with adsorptive clay in two successive stages at temperatures between 275° F. and the critical temperature of the stock, the clay employed in the first such stage having previously been used in the second stage and being partially spent from such use but having residual active capacity for reducing acid wash color and the clay employed in the second stage being fresh clay used in place of the other clay when the latter was employed in the first stage operation, and distilling the effluent from the second stage treatment to separate polymeric materials and to yield aromatic hydrocarbon product having nitration grade quality.

References Cited in the file of this patent

UNITED STATES PATENTS

| | | |
|---|---|---|
| 2,351,445 | Morgan | June 13, 1944 |
| 2,402,804 | Chechot | June 25, 1946 |
| 2,481,816 | Browder et al. | Sept. 13, 1949 |
| 2,726,997 | Dudley et al. | Dec. 13, 1955 |
| 2,744,942 | Wankat | May 8, 1956 |